United States Patent [19]

Hamstra et al.

[11] Patent Number: 4,706,191
[45] Date of Patent: Nov. 10, 1987

[54] LOCAL STORE FOR SCIENTIFIC VECTOR PROCESSOR

[75] Inventors: James R. Hamstra, Plymouth; Howard A. Koehler, Minneapolis; John T. Rusterholz, Roseville; David J. Tanglin, Anoka, all of Minn.

[73] Assignee: Sperry Corporation, New York, N.Y.

[21] Appl. No.: 761,135

[22] Filed: Jul. 31, 1985

[51] Int. Cl.[4] .............................................. G06F 3/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,128,880 | 12/1978 | Cray, Jr. | 364/200 |
| 4,344,134 | 8/1982 | Barnés | 364/200 |
| 4,365,292 | 12/1982 | Barnes et al. | 364/200 |
| 4,414,624 | 11/1983 | Summer, Jr. et al. | 364/200 |
| 4,594,682 | 6/1986 | Drimak | 364/900 |
| 4,600,986 | 7/1986 | Scheuneman et al. | 364/200 |

Primary Examiner—Gary V. Harkcom
Assistant Examiner—Randy Lacasse
Attorney, Agent, or Firm—Charles A. Johnson; Lawrence J. Marhoefer

[57] ABSTRACT

A local store for a scientific vector processor which provides high speed access to scalar variables, parameters, temporary operands, and register save area contents of the system. Basically, the local store is a general purpose storage structure which provides access which is as fast as access to the general or vector registers of the vector processor. It is capable of being accessed either directly or indirectly via indexing. It resides in the virtual address area of the machine so that it is accessible for either reading or writing by the host programs. Because of its positioning in relation to the high performance main storage unit its size is transparent to the other programs of the system since it overflows automatically into the main storage unit. It also has multiple interfaces which provide a more simple matching of the bank widths and transfer rates of the rest of the scientific processor.

14 Claims, 20 Drawing Figures

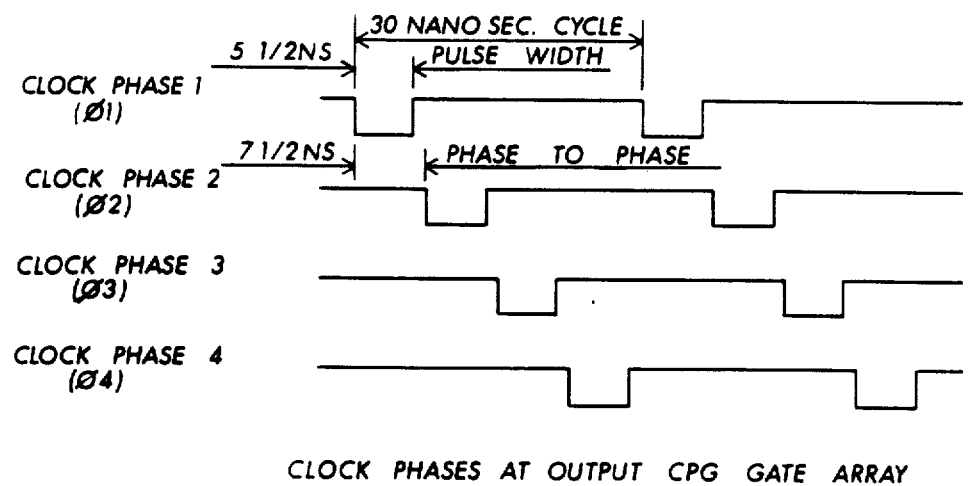
CLOCK PHASES AT OUTPUT CPG GATE ARRAY
FIG. 7
FIG. 6
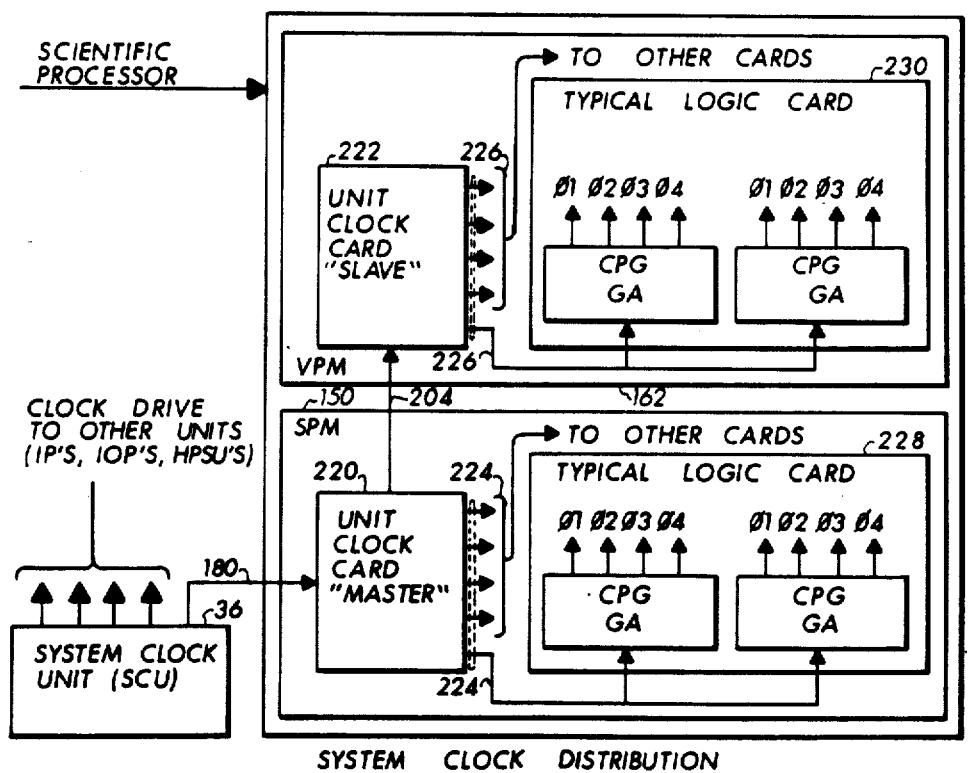
SYSTEM CLOCK DISTRIBUTION

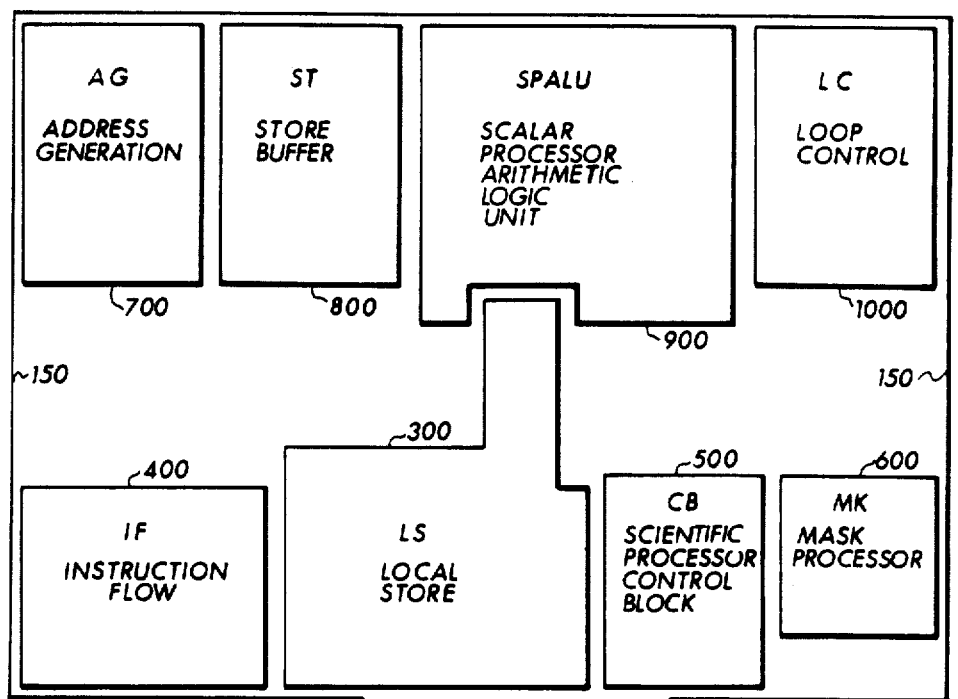
FIG. 8  SPM BLOCK DIAGRAM
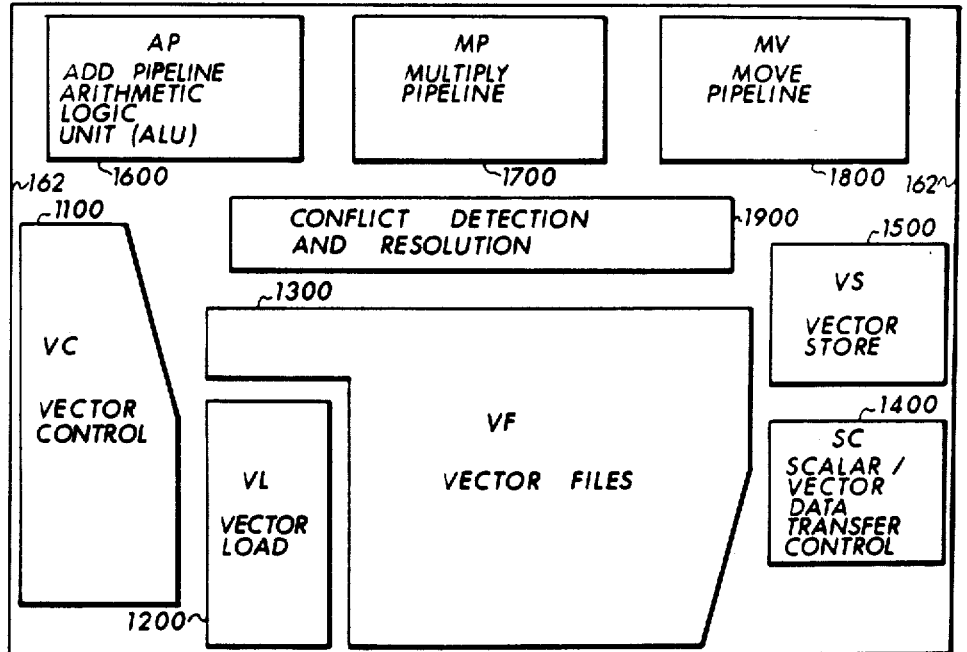
FIG. 9  VPM BLOCK DIAGRAM

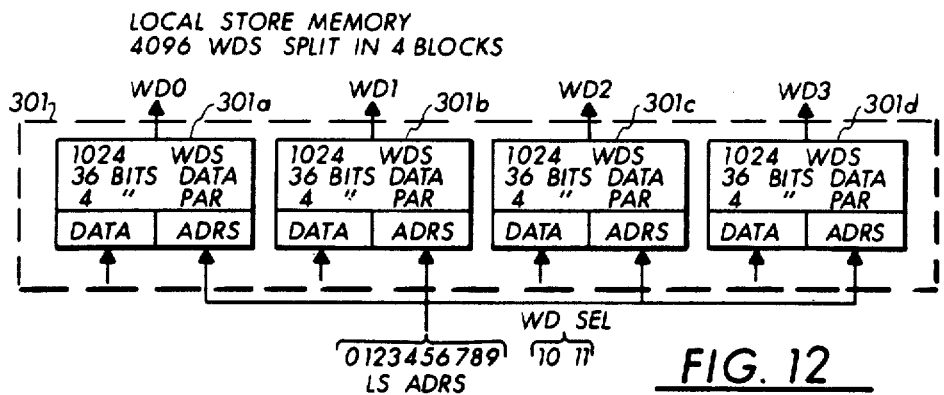
FIG. 12
LOCAL STORE ACCESS
SCALAR INSTRUCTIONS
RS FORMAT
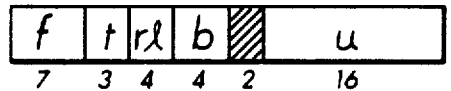
FIG. 13
IF b=00 AND u≤4096
u-FIELD FORMS THE LS ADRS
IF b=15 THE 11 BIT POINTER
IN S7 WITH THE 5 RIGHTMOST
BITS OF u CATENATED ON THE
RIGHT FORM THE LS ADRS IF≤4096
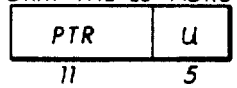
IF b=01-14 AND THE VA MAPS IN THE
LOCAL STORE SEGMENT AND
VSO+u≤4096 THIS FORMS THE LS ADRS
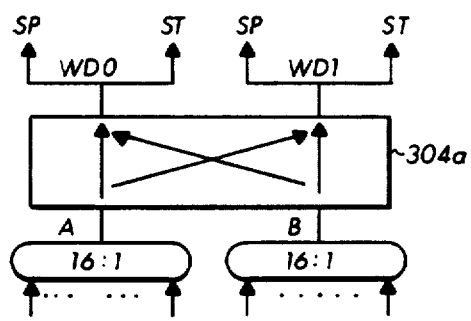
FIG. 14

G. INTERFACE FOR INPUT DATA TO LOCAL STORE
DATA INPUT TO LOCAL STORE MEM

INTERFACE TO ST-(WDS 2+3)

SAME POSSIBLE COMBINATIONS OF DATA XFER AS WDS 0+1

INTERFACE TO VECTOR PROCESSOR

LOCAL STORE FOR SCIENTIFIC VECTOR PROCESSOR

RELATED PATENT APPLICATIONS

The following co-pending patent applications are assigned to the assignee of this invention, and their teachings are incorporated herein by reference:

Title: HIGH PERFORMANCE STORAGE UNIT
 Inventor: James H. Scheuneman
 Ser. No.: 596,130
 Filed: Apr. 2, 1984
Title: MULTIPLE UNIT ADAPTER
 Inventor: James H. Scheuneman
 Ser. No.: 596,205
 Filed: Apr. 2, 1984
Title: A SCIENTIFIC PROCESSOR
 Inventors:
  Louis B. Bushard
  Larry L. Byers
  James R. Hamstra
  Charles H. Homan
  Archie E. Lahti
  John T. Rusterholz
 Ser. No.: 761,201
 Filed: July 31, 1985

BACKGROUND OF THE INVENTION

A. Field of the Invention

The present invention relates to scientific data processing systems. More particularly it relates to those scientific vector data processing systems which require high speed access to scalar variables, parameters, temporary operands and register save areas in the data processing system. A local store is disclosed which serves as an internally available portion of the main store associated with the task which is currently active on the scientific vector processor. The content of the local store is moved from the main store upon initiation of the task start-up sequence. Thereafter, the local store provides programmer transparent high speed access with no main store delays for high use constants or scratch-pad operations. The content of the local store is returned to the main store upon task completion or upon exit from the scientific vector processor.

B. Prior Art

Past attempts to overcome the delay caused by access to the main memory of a data processing system have been directed to the use of either special purpose memories or cache memories. These were often small high speed memories which usually had to be used separately by the programmer. Further, since they were of a fixed size, care had to be taken by the programmer to ensure that the memory did not overflow.

In previous architectural approaches, these small, high speed memories were usually accessible only to a particular portion of the system. In fact, in most instances, they were accessible only to the arithmetic logic unit of the data processing system. They were used to store information which needed to be accessed often and quickly by the ALU. The information stored there was so specified by the programmer and much attention was needed by him to be sure that such information was brought from the main memory to the small high speed memory prior to its need by the ALU.

Other increases in computing rates have been achieved through advances in physical technologies relating to software and hardware functioning. The advent of integrated circuitry gave rise to circuit components operable at very fast computing rates, and capable of performing complex functions while remaining economically feasible. Access and cycle time of memories has also been markedly decreased.

In addition to the changes and developments in the hardware, there have been continuing advances in the organizational architecture of data processing systems that provide for ever-increasing utilization of the various data processing components. While many examples of optimization of utilization of the components comprising the data processing systems can be described, attention will be directed to the concept of increasing data processing rates by providing for a local store having single cycle access time.

This invention addresses the need for a unique high speed local store apparatus which provides fast access by various portions of the processor to the information stored therein.

BRIEF DESCRIPTION OF THE INVENTION

A. Objects of the Invention

It is therefore an object of this invention to provide an improved local storage apparatus for a scientific vector data processing system.

It is also an object of this invention to disclose an improved local storage apparatus capable of providing high speed access to selected information in a scientific vector processor.

It is a further object of this invention to provide an improved general purpose local storage arrangement capable of providing memory access as quickly as possible with the general or vector registers of the scientific vector processors.

It is a still further object of this invention to provide an improved local storage arrangement having both direct and indexed access to the local store.

It is also an object of the present invention to provide a local store apparatus for a scientific vector processor having a memory size which is transparent to the programmer since the local store apparatus is capable of overflowing into the main memory.

It is still another object of the present invention to provide a local store apparatus which is positioned in the virtual address space enabling it to be read from or written into by the host processing system.

It is still a further object of the present invention to provide an improved local store apparatus which may be used as an ordinary memory by the programmer.

It is another object of the present invention to provide an improved local store apparatus whose memory bank width is equally matched to the system main memory and also to the vector register file.

It is a still further object of the present invention to provide an improved local store apparatus, which has a main memory interface and a vector processor interface both of which are less complicated than a cache memory interface.

B. Summary of the Invention

A Local Store apparatus is disclosed which provides high speed memory access to scalar variables, parameters, temporary operands and register save areas in a Scientific Processor. The main memory (HPSU) of the Scientific Processor includes a local store segment. Upon initiation of the Scientific Processor, data from the Local Store segment of the main memory, as defined by an Activity Segment Table entry, is entered into the Local Store memory located in the Scalar Processor Module. There are four thousand, ninety-six (4096) total words entered into the Local Store. It serves as an internally available portion of the main storage associated with the currently active task in the Scientific Processor. It provides high speed access without main storage delays for high use constants. It is also used in virtual address space which enables it to be written into and read from by the host processor. It provides single-cycle access to a general purpose Local Store by positioning this memory such that it is an extension of the main memory where it is as accessible as the main memory, without the usual delay associated with the main memory. Finally, the Local Store has a size which is transparent to the programmer operating the Scientific data processing system.

BRIEF DESCRIPTION OF THE DRAWINGS

The foregoing objects and the above summary will be more readily understood when read in conjunction with the accompanying drawings in which:

FIG. 6 is a block diagram of the Clock Distribution system used in the SVP;

FIG. 7 is a timing diagram of the Clock Phases of the Clock Distribution System;

FIG. 8 is a simplified pictorial diagram of the Scalar Processor Module (SPM) of the SVP;

FIG. 9 is a simplified pictorial diagram of the Vector Processo Module (VPM) of the SVP;

The following eleven figures, namely FIGS. 10, 11, 12 13, 14, 15, 16, 17, 18, 19 and 20 correspond to FIGS. 133 through 143 respectively, of the parent application which is co-pending herewith and which is incorporated herein by this reference.

Figure 10:
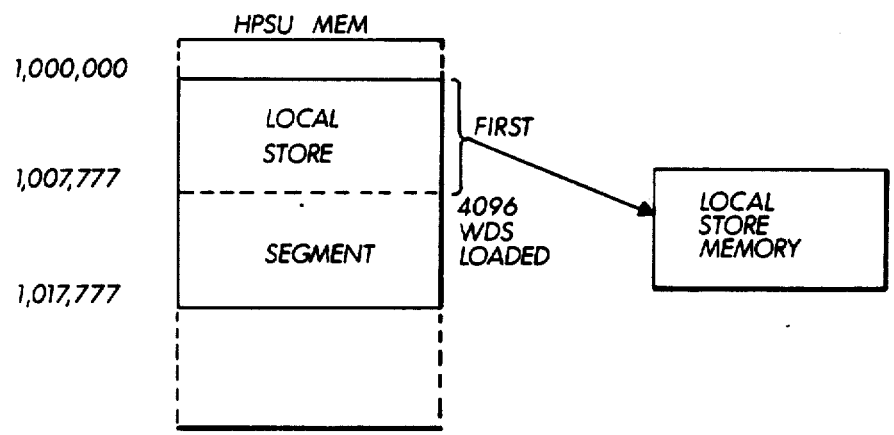
Figure 11:
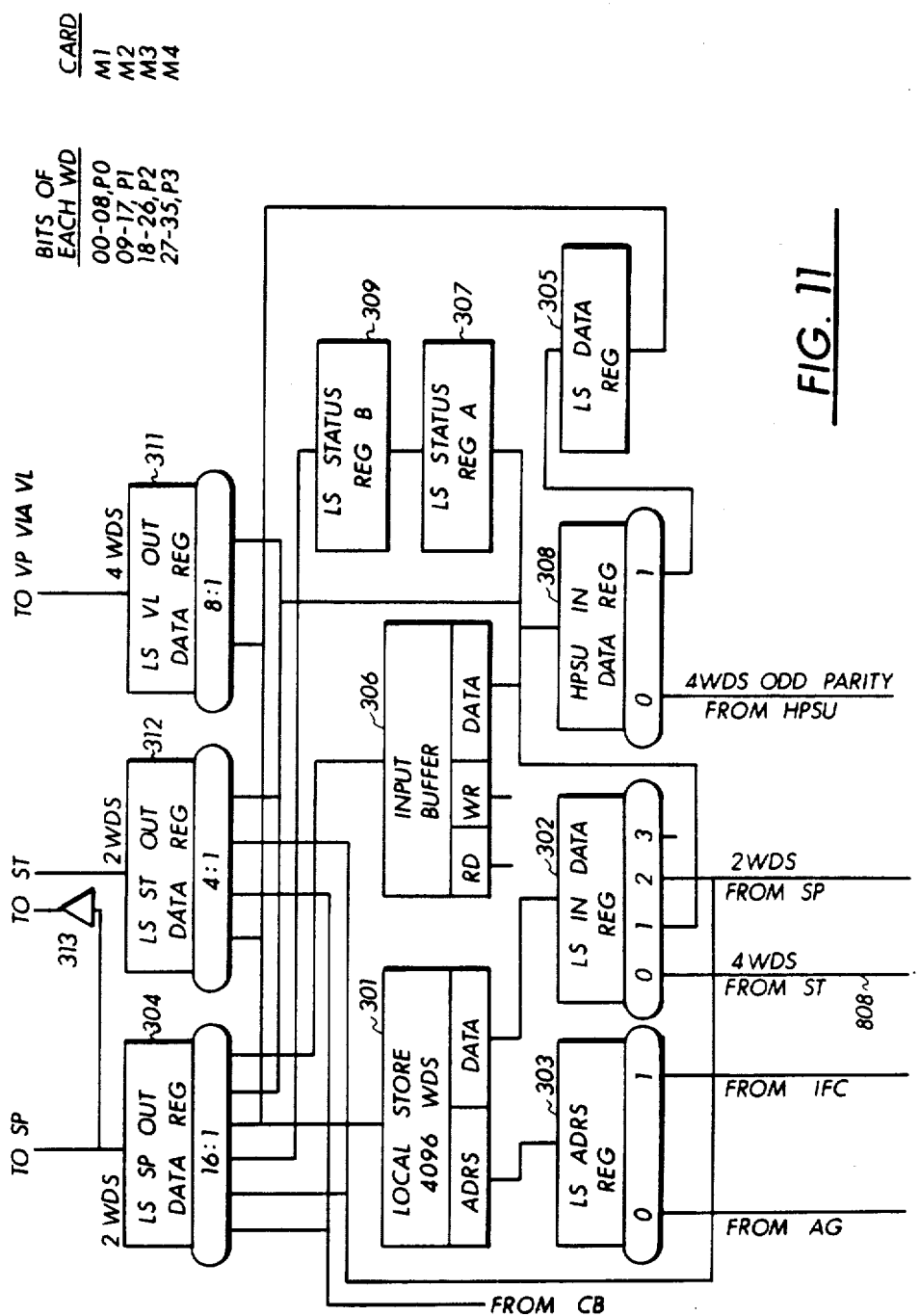
Figure 15:
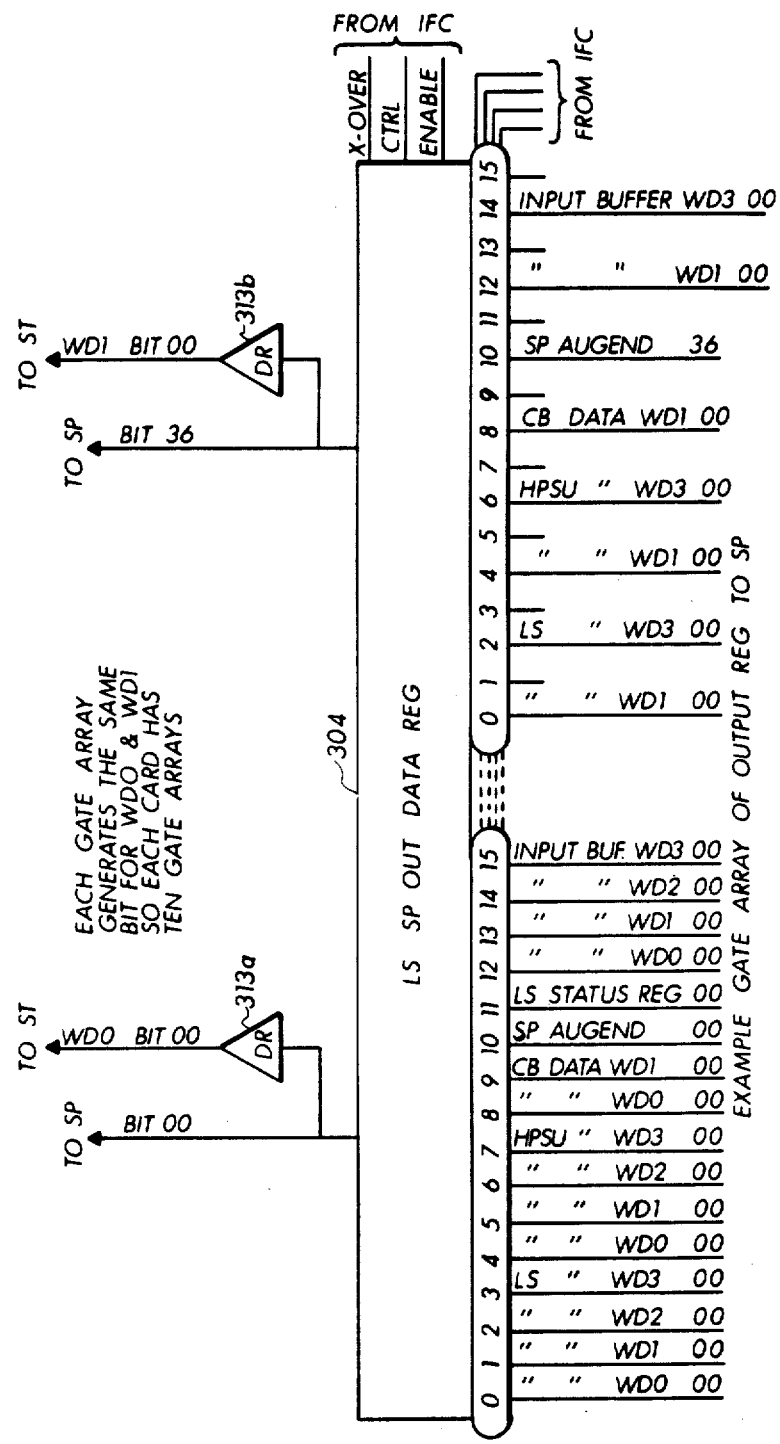
Figure 18:
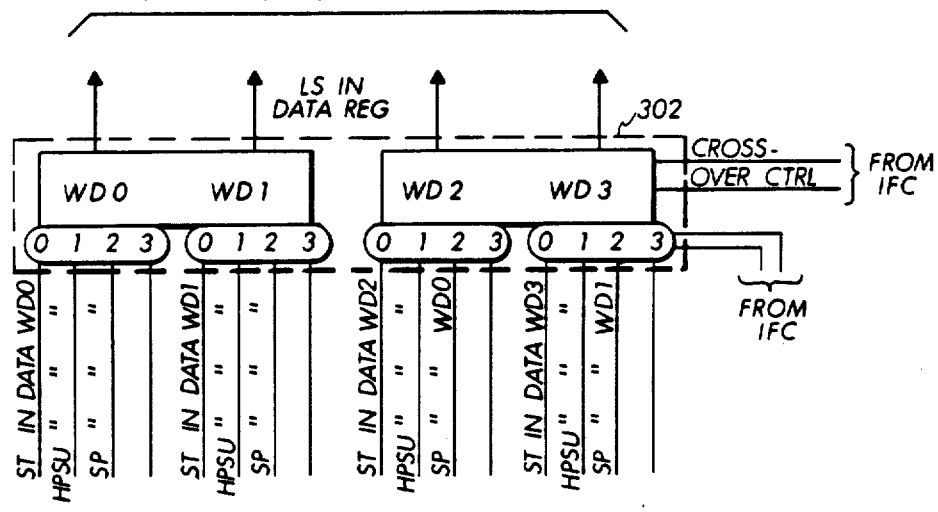
Figure 16:
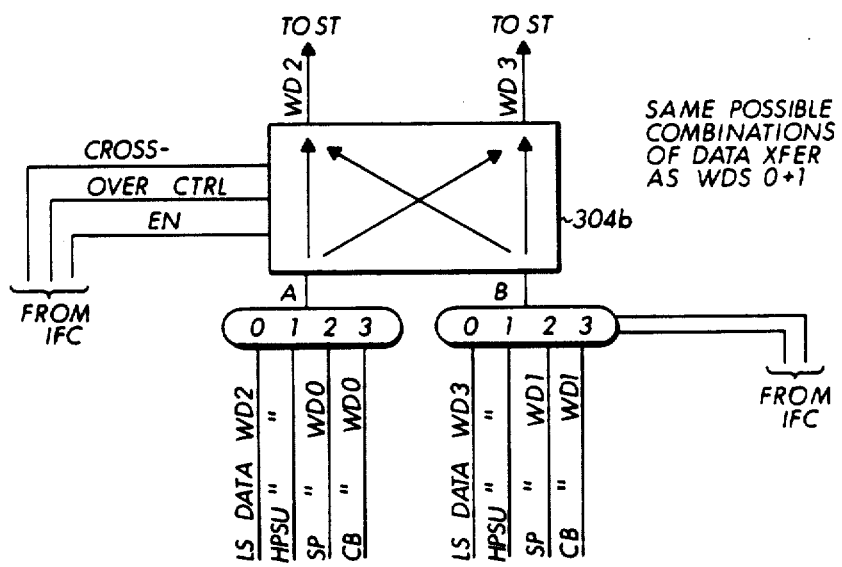
Figure 17:
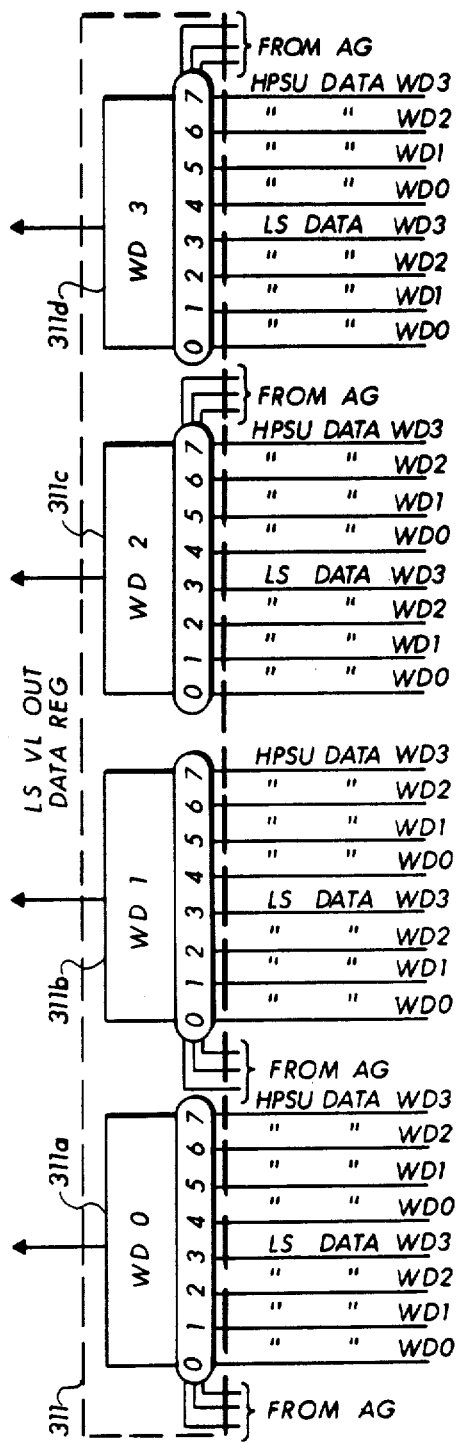
Figure 19:
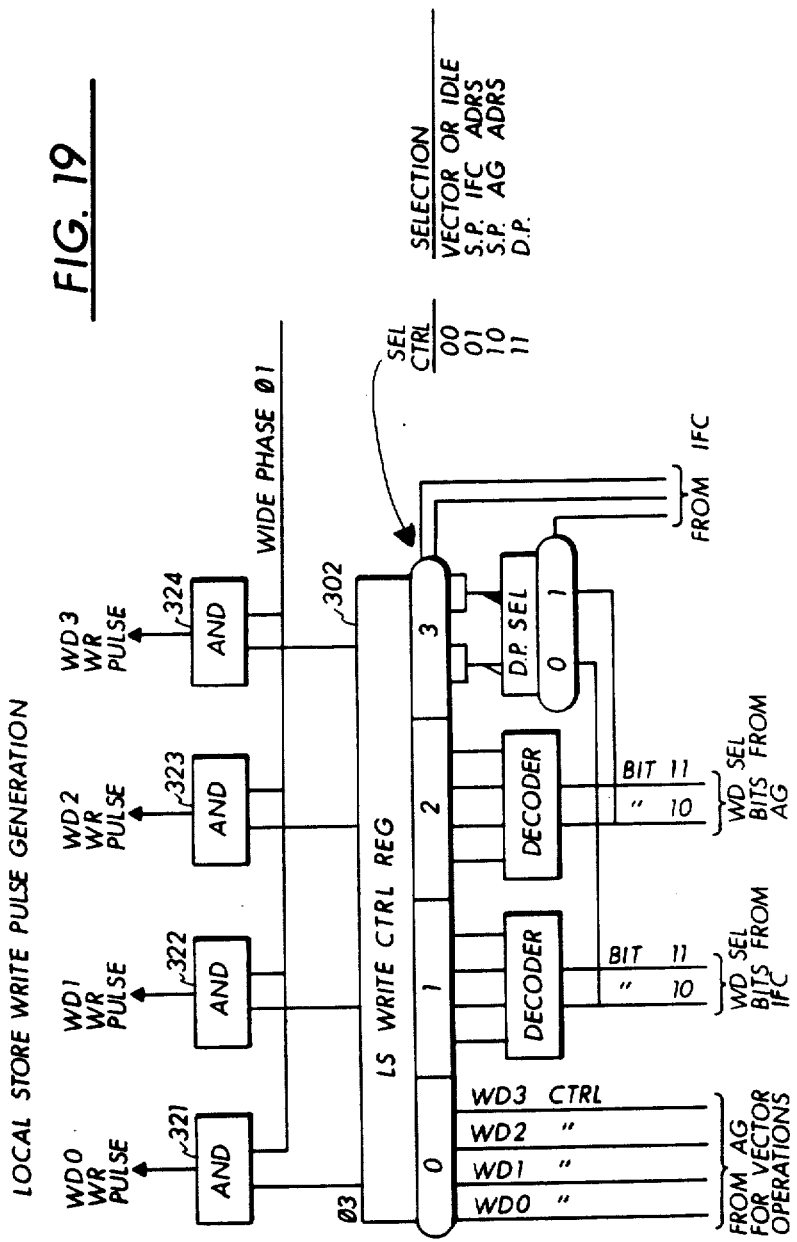
Figure 20:
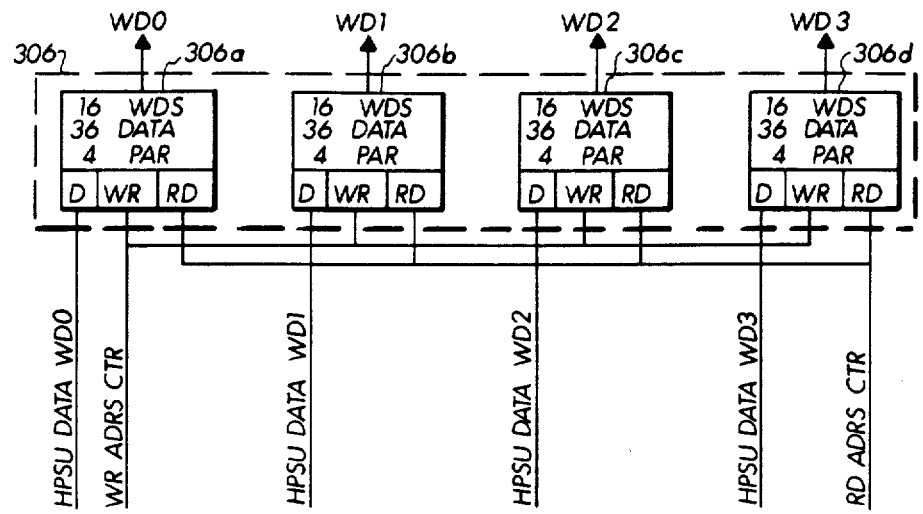

FIG. 10 is a pictorial diagram of the interaction between the main memory, the High Performance Storage Unit (HPSU), and the Local Store (LS) of the present invention;

FIG. 11 is a logical block diagram of the Local Store apparatus of the present invention;

FIG. 12 is a pictorial block diagram illustrating the Local Store memory organization;

FIG. 13 illustrates the scalar instruction RS format used to access the Local Store;

FIG. 14 is a simplified block diagram showing the interface between the Local Store and the Scalar Processor (SP) and the Store Buffer that is used to provide words zero and one to the SP and to the ST;

FIG. 15 is an example of the gate array of the output register to the Scalar Processor showing in more detail the input signals to the Local Store Scalar Processor output data register shown generally in FIG. 11;

FIG. 16 illustrates a more detailed interface block diagram of the Local Store output register to the Store Buffer (ST) for data words 2 and 3, which data words can be transferred in the same combination as data words 1 and 2 shown in FIG. 14;

FIG. 17 shows a detailed block diagram of the interface connections between the Local Store, Vector Load output data register and the Vector Processor Module;

FIG. 18 illustrates another detailed block diagram of interface connections showing the interface for input data to the Local Store from the Store Buffer, the HPSU, and the Scalar Processor Module;

FIG. 19 presents a detailed logic block of the registers and gates utilized to provide the generation of write pulses to the Local Store, including a table of the selection signals necessary to control the Local Store write control register; and FIG. 20 illustrates a detailed block diagram of the input buffer shown generally in FIG. 11 and including a breakdown of the buffer circuit into four, sixteen word sections.

| GLOSSARY | |
|---|---|
| TERM | DEFINITION |
| ACCEL | ACCELERATE |
| ADD | ADDEND |
| ADRS | ADDRESS |
| AG | ADDRESS TRANSLATION AND GENERATION SECTION |
| AI | ATTENTION INTERRUPT |
| ALT1 | FIRST ALTERNATE ELEMENT COUNT |
| ALT2 | SECOND ALTERNATE ELEMENT COUNT |
| ALU | ARITHMETIC LOGIC UNIT |
| AP | ADD PIPELINE SECTION (ALU) |
| ARM | AVAILABILITY, RELIABILITY, MAINTAINABILITY |
| AST | ACTIVITY SEGMENT TABLE |
| AUG | AUGEND |
| BFR | BUFFER |
| BNA | BANK NOT AVAILABLE |
| BPA | BOARD-PAIR ASSEMBLY |
| BRKPT | BREAKPOINT |
| BUF | BUFFER |
| BVL | BEGIN VECTOR LOOP |
| CB | CONTROL BLOCK SECTION |
| CAM | CONTENT ADDRESSABLE MEMORY |
| CELP | CURRENT ELEMENT LOOP POINTER |
| CBS | CB MEMORY SHADOW RESIGER |
| CLK | CLOCK |
| CLR | CLEAR |
| COMPR | COMPARE |
| CNT | COUNT |
| CONSIM | CONCURRENT FAULT SIMULATOR |
| CP | CHARACTERISTIC PIPELINE |
| CPG | CLOCK PULSE GENERATOR |
| CTRL | CONTROL |
| CVLP | CURRENT VECTOR LOOP POINTER |
| DBL | DOUBLE |
| DEC | DECELERATE |
| DES | DESIGNATOR |
| DEST | DESTINATION |
| DIAG | DIAGNOSE INSTRUCTION |
| DP | DOUBLE PRECISION |
| DP-FLP | DOUBLE PRECISION FLOATING POINT |
| DP-FXP | DOUBLE PRECISION FIXED POINT |
| EDC | ERROR DATA CAPTURE |
| EI | EXTERNAL INTERRUPT |
| EIF | EXECUTE IMMEDIATE FUNCTION |
| EL | ELEMENT LOOP |
| ELCNT | ELEMENT COUNT |
| ELPT | ELEMENT POINTER |
| EM | EXTERNAL MONITOR INTERFACE SECTION |
| EN | ENABLE |
| FDD | FIELD |
| FLP | FLOATING POINT |
| FXP | FIXED POINT |
| G | G REGISTER |
| GA | GATE ARRAY |
| GIV | GENERATE INDEX VECTOR |
| GOP | G OPERAND |

GLOSSARY

| TERM | DEFINITION |
|---|---|
| HPP | HIGH PERFORMANCE PACKAGING TECHNOLOGY |
| HPSU | HIGH PERFORMANCE STORAGE UNIT |
| IA | INSTRUCTION ADDRESS |
| IDX | INDEX |
| IF | INSTRUCTION FLOW SECTION (CONSISTS OF IFA, IFB, & IFC) |
| IFA | INSTRUCTION FLOW ADDRESSING |
| IFB | INSTRUCTION FLOW BUFFER |
| IFC | INSTRUCTION FLOW CONTROL |
| IIH | INTERFACE INTERRUPT HANDLING |
| INTFC | INTERFACE |
| INTRP | INTERRUPT |
| INVLD | INVALIDATE |
| INTIN | INTERRUPTING INSTRUCTION |
| IP | INSTRUCTION PROCESSOR |
| IOP | INPUT/PROCESSOR |
| IPL | INITAL PROGRAM LOAD |
| IPCU | INSTRUCTION PROCESSOR COOLING UNIT |
| IUCT | IN UNIT CARD TEST |
| LSB | LEAST SIGNIFICANT BIT ($2^{35}$ IN 36 BIT WORD) |
| JHF | JUMP HISTORY FILE |
| LC | LOOP CONTROL SECTION (VECTOR LOOP & EL LOOP REG.) |
| LCS | LOOP CONTROL STACK |
| LD | LOAD |
| LS | LOCAL STORAGE (4K RAM IN LOCAL STORE) |
| LSI | LARGE SCALE INTEGRATED CIRCUITS |
| LSS | LOCAL STORAGE STACK SECTION) |
| LSSA | LOCAL STORAGE SEGMENT ADDRESS |
| MCI | MAINTENANCE AND CONTROL INTERFACE |
| MEC | MAXIMUM ELEMENT COUNT |
| MFLOPS | MILLION FLOATING POINT OPERATIONS PER SECOND |
| MK | MASK PROCESSOR SECTION |
| MP | MULTIPLY PIPELINE |
| MPS | MULTIPLY PIPELINE SECTION |
| MPCD | MULTIPLICAND |
| MPI | MULTIPLE PASS INSTRUCTION |
| MRDNG | MOVE REGISTER DATA-NOT A G REGISTER |
| MSB | MOST SIGNIFICANT BIT ($2^0$ IN 36 BIT WORD) |
| MUA | MULTIPLE UNIT ADAPTER |
| MULTR | MULTIPLIER |
| MUX | MULTIPLEXER |
| MV | MOVE PIPELINE SECTION |
| MZ | MAXIMUM STRIP SIZE . |
| NELCNT | NEXT ELEMENT COUNT |
| NLJ | NON-LOCAL JUMP |
| NOVLP INST | NONOVERLAPPED INSTRUCTION |
| OLM | ONLINE MAINTENANCE |
| PAR | PROGRAM ADDRESS REGISTER (ADDRESS OF NEXT INSTRUCTION) |
| PT | POINTER |
| PCC | POWER COUPLING CONTROL |
| RAM | RANDUM ACCESS MEMORY |
| RDY | READY |
| REG | REGISTER |
| RR | REGISTER-TO-REGISTER INSTRUCTION FORMAT |
| RSLT | RESULT |
| RS | REGISTER-TO-STORAGE INSTRUCTION FORMAT |
| SAEV | STORE ALTERNATE ELEMENT |
| ST | STORE BUFFER SECTION |
| SC | SCALAR/VECTOR DATA TRANSFER CONTROL SECTION |
| SCC | SCALAR CONDITION CODE |
| SCG | SINGLE CONDITION GENERATE |
| SCU | SYSTEM CLOCK UNIT |
| SCS | SCALAR LOCAL STORE |
| SEDC | SCANSET ERROR DATA CAPTURE |
| SEL | SELECT |
| SI | STORAGE INTERFACE |
| SIMD | SINGLE INSTRUCTION MULTIPLE DATA |
| SLR | STORE LOOP CONTROL REGISTER |
| SP | SCIENTIFIC PROCESSOR |
| SP ALU | SCALAR PROCESSOR ARITHMETIC LOGIC SECTION |
| SP-FLP | SINGLE PRECISION FLOATING POINT |
| SP-FP | SINGLE PRECISION FIXED POINT |
| SPCB | SCIENTIFIC PROCESSOR CONTROL BLOCK |
| SPM | SCALAR PROCESSOR MODULE |
| SPP | SYSTEM PROBE PANEL |
| SRC | SOURCE |
| SS | SCANSET SECTION |
| SSI | SMALL SCALE INTEGRATED CIRCUITS |
| SSP | SYSTEM SUPPORT PROCESSOR |
| ST | STORE BUFFER SECTION |
| SUNA | STORAGE UNIT NOT AVAILABLE |
| SV | STORE VECTOR |
| SVX | STORE VECTOR INDEXED |
| TC | TIMING CHAIN |
| TM | TRACKING MEMORY |
| TS | TIME SLOTS |
| UCM | UNIT CONTROL MODULE |
| UIA | UNIVERSAL INTERFACE ADAPTER |
| UP | UNIVERSAL PROCESSOR INTERFACE SECTION |
| UPI | UNIVERSAL PROCESSOR INTERFACE |
| USC | UNIT SUPPORT CONTROLLER |
| VC | VECTOR CONTROL SECTION |
| VCW | VECTOR CONTROL WORD |
| VF | VECTOR FILE |
| VL | VECTOR LOOP |
| VL | VECTOR LOAD |
| VOP | VECTOR OPERAND |
| VP | VECTOR PROCESSOR |
| VPM | VECTOR PROCESSOR MODULE |
| VPW | VECTOR PARAMETER WORD |
| VS | VECTOR STORE |
| VSO | VIRTUAL SEGMENT OFFSET |
| VS | VECTOR STORAGE SECTION |
| VV | VECTOR STORAGE INSTRUCTION FORMAT |
| WO | WORK CAPACITY |
| WR | WRITE |

DETAILED DESCRIPTION OF THE PREFERRED EMBODIMENT

A. Conventions

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor. a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of a High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead input lines will provide a low at the output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead output would normally indicate and AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various type of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function; and the symbol having a curve at the input and the curve pointed output, often referred to as the "shield" symbol, represents circuits that perform the logical OR function. For the AND or OR functions the straight line input or the dot, represents a High AND or High OR respectively, and results in a High output signal when all input signals are High for AND, or a High output signal when any input is High for a High OR. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

Figure 1:
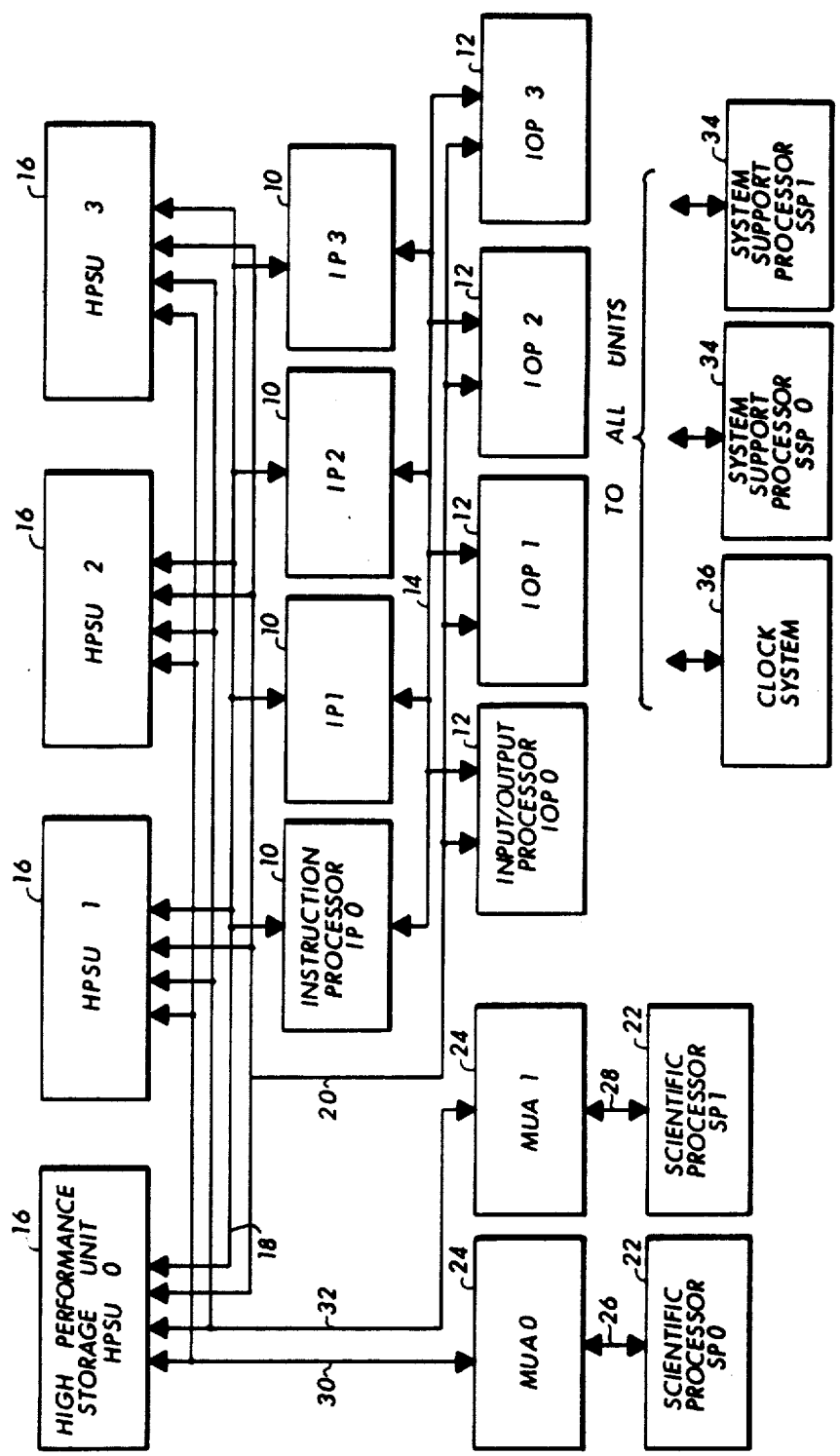
FIG. 1 is a system block diagram of the over-all digital data processing system in which the invention can be utilized.

FIG. 1 is a system block diagram of the over-all digital data processing system in which the invention can be utilized. The over-all system is essentially modular, and provides for parallel processing.

For the configuration illustrated, from one to four Instruction Processors IP0 through IP3, each labelled 10, can be utilized. Each IP can, for example, be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and, in general, does data manipulation. The IP also executes instructions to set up input and output data buffers and channel access control.

In conjunction with the IPs, from one to four Input/Output Processors IOP0 through IOP3, labelled 12, can be utilized. The interconnections between the IPs and the IOPs, collectively labelled 14, are, in fact, direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnectuion paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified co-pending incorporated patent applications.

Error Correction Code (ECC) is used internally to each HPSU to provide single-bit error correction and double-bit error detection.

In the embodiment illustrated one or two Scientific Processor SP1 and SP2, labelled 22, can be utilized. If a single SP is used with a single HPSU, it may be coupled directly to the SP port of such HPSU. The SP can be, for example, a Type 3068-00 unit available from Sperry Corporation. When two or more HPSUs are used with an SP, it is necesssary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through intercommunication path 32.

Each SP functions under direction of one or more of the IPs to perform scientific type calculations in a support mode. In this regard, the IPs can be considered to be the so-called "host" processors and the SPs can be considered to be support processor, all operating through common storage. The host IPs execute the master operating system and function to initiate specific tasks in the SPs. The SPs respond and execute the instructions necessary to accomplish the assigned tasks. The instruction set of the SPs include scalar and vector instructions, as will be described below, and interfaces with the HPSUs without need for large quantities of dedicated storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A Clock System 36 is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock. The clock system is novel, and is described in one of the above identified co-pending patent applications.

Intercommunication between units is essentially on a Request and Acknowledge basis, and the interfaces will be described in more detail as appropriate.

C. High Performance Storage Unit (HPSU)

Figure 2:
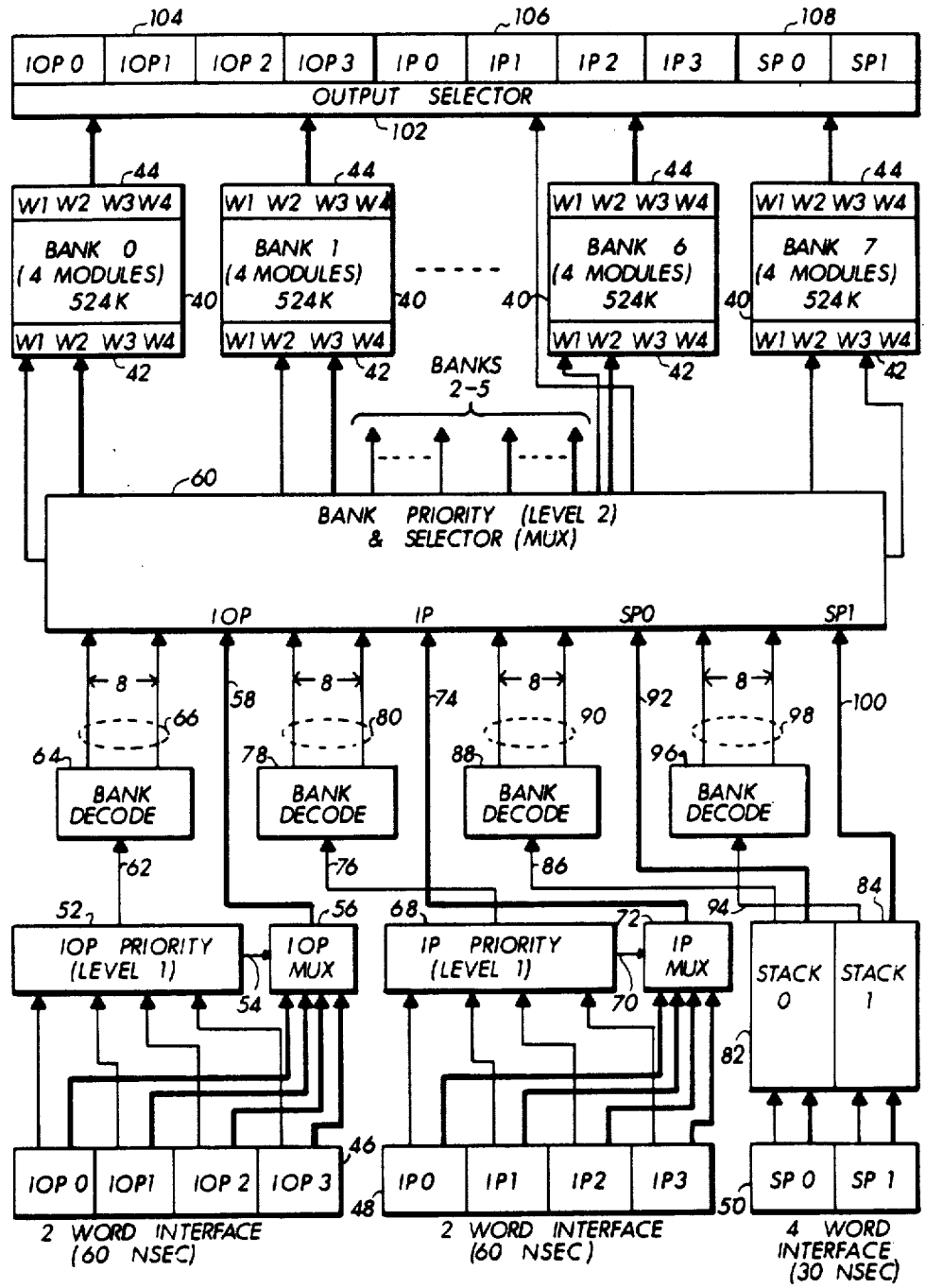
FIG. 2 is a simplified functional blocked diagram of the High Performance Storage Unit.

FIG. 2 is a simplified functional block diagram of the High Performance Storage Unit (HPSU).

The HPSU is a storage device that is commonly accessible by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IOP0 through IOP3. The IOP ports 46 and the IP ports 48 each operate on a two-word interface at a clock rate of 60 nanoseconds.

The HPSU also has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals, provided on control path 62, drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and Stack 1 are each a first-in-first-out (FIFO) circulating buffer. The request information feeds out of Stack 0 on line 86 to the Bank Decode 88 which provides a one-of eight selection and data passes on line 92 to the Bank Priority Selector 60. Similarly, request information passes on line 94 to the Bank Decode 96 for making selections on lines 98, while the data passes on line 100.

The Bank Priority and Selector functions to select between the IOP, IP, and the two SP requests presented to it for accessing memory. It also functions to control the Output Selector 102 when reading is to take place. The HPSU has an IOP output 104 capable of handling four IOP ports IOP0 through IOP3. It also has an IP output 106 capable of handling four IP ports labelled IP0 through IP3. Finally, it has an SP output 108 capable of handling two SP output ports (from the HPSU)-labelled SP0 and SP1. Data rates and timing at the output ports 104, 106, and 108 are similar to those for the input ports previously described.

The HPSU is described in detail in one or more of the identified co-pending applications.

D. Multiple Adapter (MUA)

Figure 3:
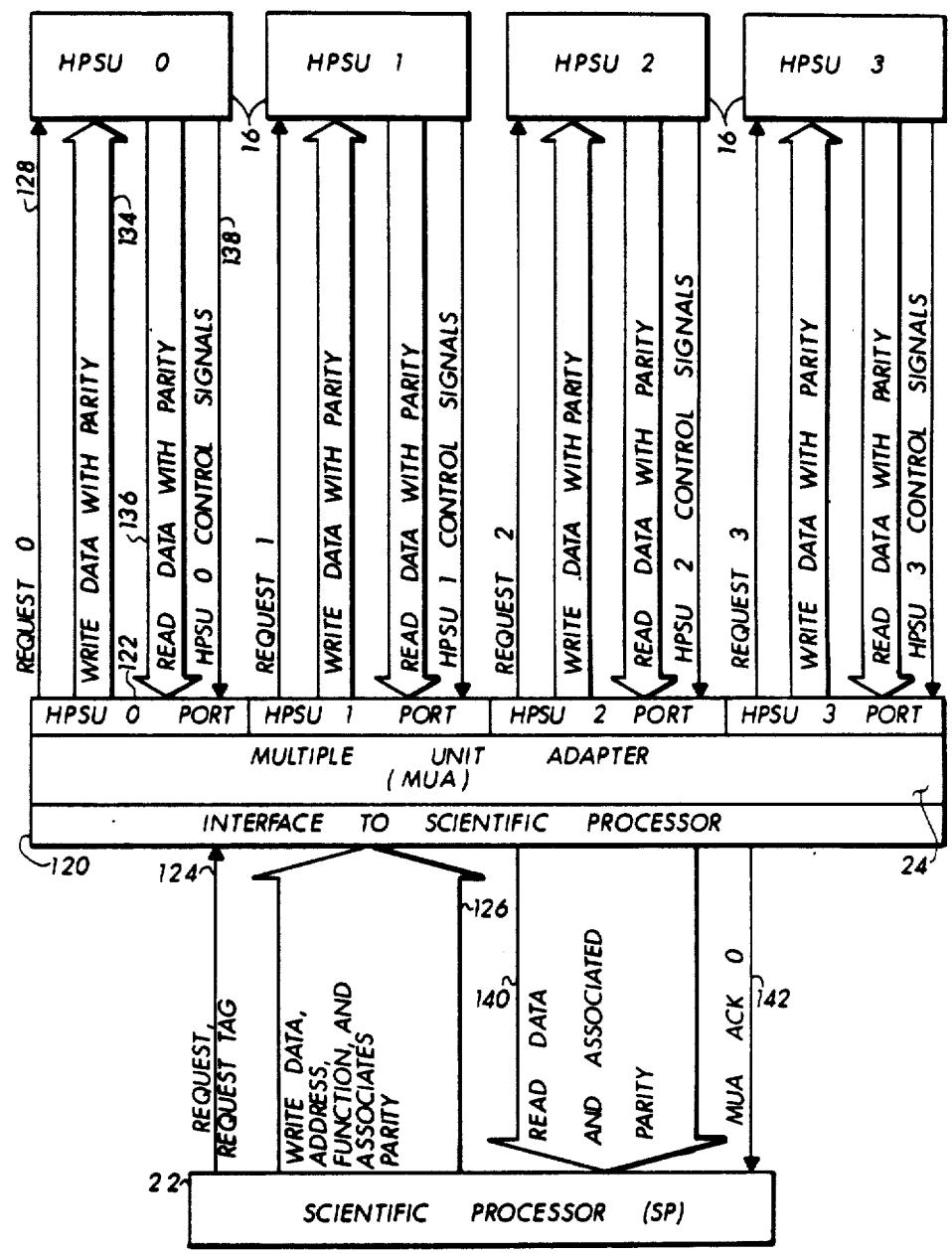
FIG. 3 is a simplified block diagram of the Multiple Unit Adapter (MUA) for providing selective interconnection of a Scientific Processor to one of up to four High Performance Storage Units.

FIG. 3 is a simplified block diagram of the Multiple Unit Adapter (MUA) for providing selective interconnection of a Scientific Processor 22 to one of up to four High Performance Storage Units 16.

The MUA 24 has an Interface 120 to Scientific Processor (SP) 22 and up to four HPSU ports 122, each adapted for interconnection to an associated HPSUs 16.

A Scientific Processor (SP) 22 issues Request signals on control path 124 to the MUA. For a write operation, the write data, address, function, and associated parity is provided via cable 126. The MUA can accumulate up to eight requests from the SP without acknowledgement, and the requests and the associated data are stored in a first-in-first-out (FIFO) stack (not shown). This accumulation can be considered as pipelined or queued requests.

For purposes of example, if it is assumed that the SP has designated HPSU0, and the request is determined by the MUA to be the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPUS0 control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) signal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSU1, HPSU2, and HPSU3, would function in a similar manner. When the SP requests access to a different HPSU, all outstanding requests to the first HPSU must be serviced prior to the MUA processing requests to a different HPSU.

All data and control signals from the SP are passed on to the HPSU, with the exception of a few special control signals, and all data and control signals from the HPSU are passed on to the SP. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

The MUA is described in detail in one or more of the identified co-pending applications.

E. Scientific Processor (SP)

Figure 4:
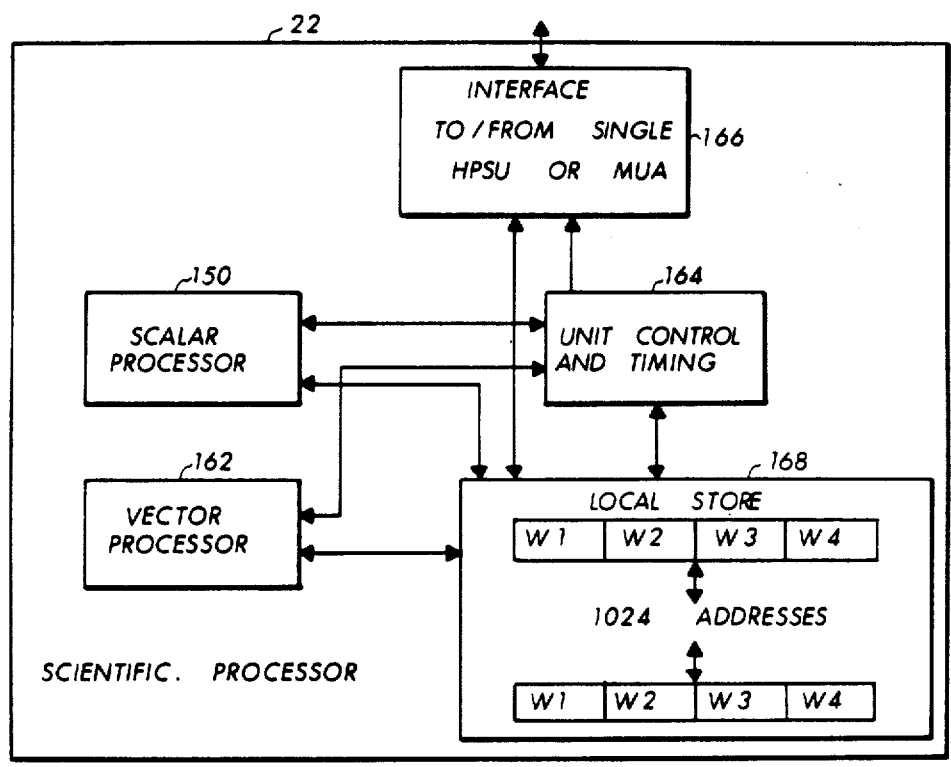
FIG. 4 is a simplified block diagram of the Scientific Processor.

FIG. 4 is a simplified block diagram of the Scientific Processor (SP).

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any priviledged modes of operation. The SP includes distinct modules, the Scalar Processor Module (SPM) 150, the Vector Processor Module (VPM) 162, the Unit Control Timing 164, the Interface 166, and the Local Store 168.

The Vector Processor Module 162 performs vector calculations. The Scalar Processor Module 150 performs scalar operations, and also has the over-all control function, including instruction fetch and issue. Generally speaking, the Scalar and Vector processor instructions require both modules to execute.

The Local Store 168 in the preferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted as distinguished from the relatively large dedicated memory sections in prior art support processors, the minimal storage being rendered sufficient through the coupling to the plurality of HPSUs. The present patent application refers to this Local Store 168.

The general system environment and background described with regard to FIG. 1 through FIG. 4 is set forth to indicate the complexity of the data processing system in which the subject invention may be utilized.

The Scientific Processor (SP) 22 is part of a tightly coupled multiprocessor system. The primary purpose of the SP is the high speed execution of vector floating-point arithmetic. As described with reference to FIG. 1 two new units have been designed to allow operation of SP(s) in the 1100/90 multiprocessor system. They are the High Performance Storage Unit HPSU(s) 16, and the Multiple Unit Adapter MUA(s) 24.

Each SP only runs user programs that are set up in an HPSU by one of the IPs. Programs and portions of programs set up for execution on an SP are called activities.

In a minimum multiprocessor system configuration utilizing an SP, the HPSU is central to the system. The SP, the IP, and the IOP all interface to the HPSU. The SP has one special port that allows requests each clock cycle, while other ports only accept requests on a two clock cycle basis. Multiple requests for the same module address range within the HPSU are honored on a certain priority basis and in that case, some of the requesters must wait their turn.

The System Clock Unit (Clock System 36) provides logic clock signals to the HPSU, the SP, the IP and the IOP. Each System Support Processor (SSP) 34 has its own clock source (not shown). The SSP is directly connected to the HPSU, the IOP, the IP and to the SP. It is also indirectly connected to the System Clock Unit 36 and to the Instruction Processor Cooling Units (not shown).

1. Interfaces

Figure 5:
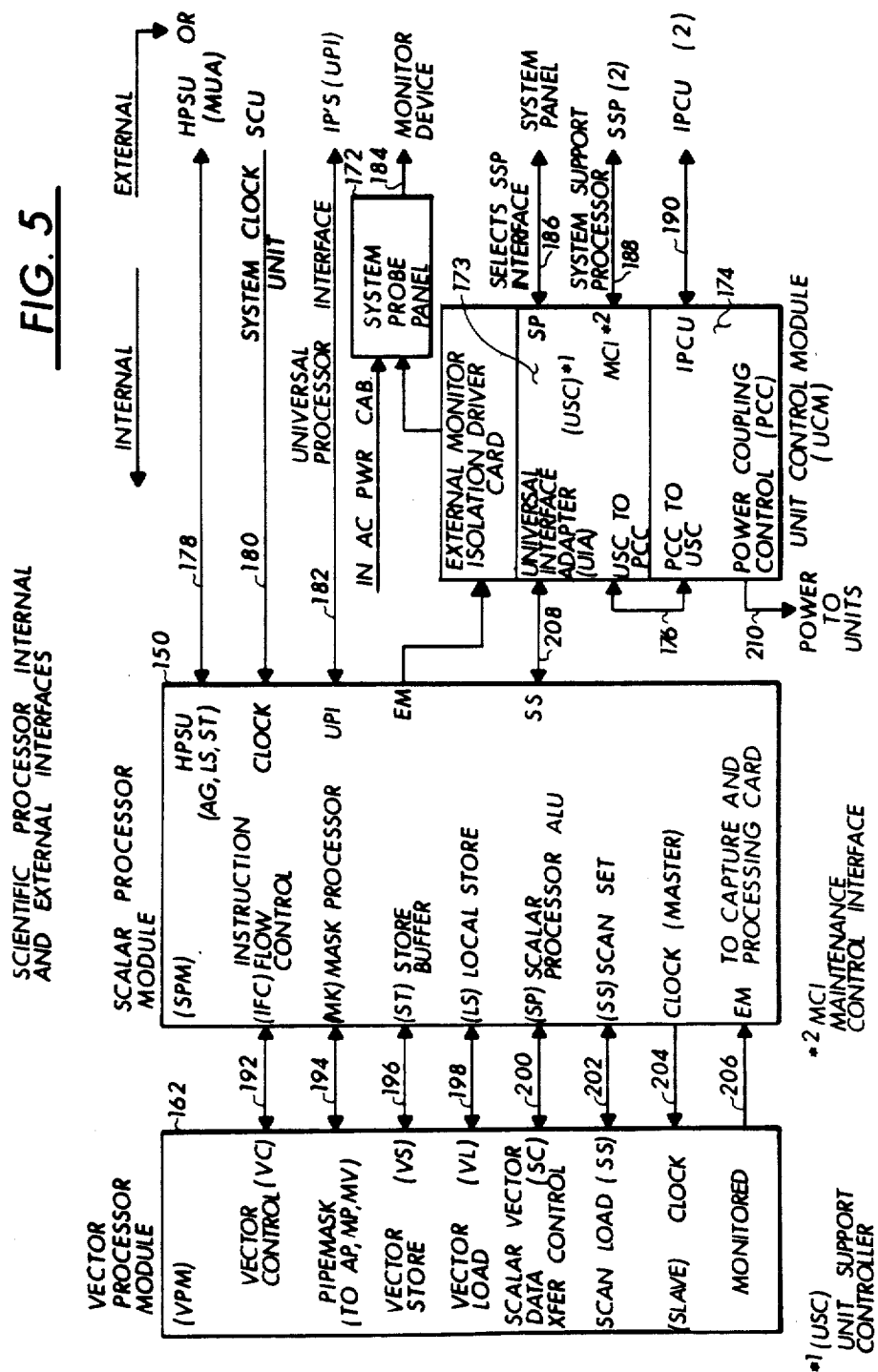
FIG. 5 is a block diagram of the Scientific Vector Processor (SVP) Internal and External Interfaces.

FIG. 5 is a block diagram of the Scientific Processor (SP) internal and external interfaces. In the Scientific Processor, which is designated as a Type 3068-0 unit available from Sperry Corporation, there are four internal units or modules, namely the Vector Processor Module (VPM) 162, the Scalar Processor Module (SPM) 150, the Unit Control Module (UCM) 170, and the System Probe Panel 172. The Unit Control Module 170 is further partitioned into two logical entities, the Unit Support Controller (USC) 173 and the Power Coupling Controller (PCC) 174. The USC-to-PCC 176 is an internal interface.

The interfaces are shown as lines, but it should be understood that this is illustrative only, and that physically there may be multiple conductors and circuits utilized. The external interfaces, are the interfaces to other units within the central complex, and are listed down the right hand side of the FIG. 5. The read/write data interface via line 178 to the HPSU or MUA interfaces with the SPM 150. The System Clock Unit (SCU) interfaces via lines 180 with the SPM 150. The Universal Processor Interface (UPI) and the Instruction Processor(s) is interfaced via line 182. The interface at the System Probe Panel 172, to the Monitor Device is via line 184. The input from the System Panel selects the SSP interface and interfaces with the Unit Support Controller 173 of the Unit Control Module 170 via line 186. One of the things that this interface does is to select the next interface. There are two interfaces via line 188 to two different System Support Processor 34 which interface with the Maintenance Control Interface (MCI) of the Unit Support Controller 173. The last external interface 190 is from the Power and Cooling Controller 174 to the Instruction Processor Cooling Units (not shown). It selects one of the two cooling units and monitors environmental conditions.

The internal interfaces are the interfaces going between the VPM 162 and the SPM 150. The instruction interface 192 is from the Instruction Flow Control (IFC) logic section of the SPM to the Vector Control (VC) section of the VPM. The mask interface 194 is from the Mask Processor (MK) of the SPM to the Add Pipe (AP), the Multiply Pipe (MP), and the Move Pipe (MV) in the VPM. These will be described in detail below. The Vector Store (VS) interface 196 provides information stored in the Vector Files to the Store Buffer (ST). It also provides information from main storage, or HPSU or Local Store. The Vector Load (VL) interface 198 transfers data from the Local Store (LS) section to the Vector Load (VL), from there it is transferred into the Vector Files. The source of the data in this case is from the HPSU or from Local Store. The Scalar Vector Data Transfer (SC) interface 200 transfers data from the SPM to the VPM. It also writes Scalar instruction into the Vector Files or broadcasts G operands. Further it transfers data in the opposite direction from the VPM to the SPM. This data could be elements from Vector Files or results or reduction instructions. The Scan Set (SS) interface 202 couples the master Scan Set card in the SPM to the slave Scan Set card in the VPM. The clock interface, 204 is from the master clock card in the SPM to the slave clock card in the VPM. The last interface shown is the External Monitor (EM) interface 206. It involves a collection of key logic signals in the VPM. These signals are routed to the SPM and ultimately they go out of the external monitor interface of the System Probe Panel 172.

There is another internal interface 208 from the SPM to the Unit Support Controller 173. This is the universal interface adapter interface from the Unit Support Controller and connects to the Scan Set card of the SPM. An interface 210 is provided between the Unit Control Module 170 and the power and cooling units (not shown).

2. Clock Distribution and Timing

FIG. 6 is a block diagram of the Clock Distribution System. The System Clock Unit (SCU) 36 provides multiple drives, with a separate drive for each IP, IOP and HPSU in the system.

The interface 180 from the System Clock Unit SCU comes into the Master unit clock card 220 in the Scalar Processor Module (SPM) 150. From there, clock signals are sent to the Slave Unit Clock Card 222 in the Vector Processor Module (VPM) 162. The unit clock cards 220 and 222 serve their respective modules. The lines 224 and 226 emanating from the unit clock cards represent the drive to remaining logic cards within the associated module. Typical logic cards 228 and 230 in each module receive the clock drive from the System Clock Unit, and utilizes two Clock Pulse Generator (CPG) Gate Arrays (GA) on each card to derive the four phase clock signals identified as phases 1, 2, 3, and 4 ($\phi 1$, $\phi 2$, $\phi 3$, $\phi 4$) for distribution on that logic card. In other words, each logic card has its associated CPG circuits.

FIG. 7 is a timing diagram of the Clock Phases. The clock phases illustrated occur at the output of the two Clock Pulse Generators on each logic card. The low portion of each clock pulse is the active level. The low period of the clock pulse is considered its active time.

Four clock pulse phases are generated. The times shown are common to all four phases. The clock cycle is 30 nanoseconds from start of one clock pulse in a phase to the start of the next occurring pulse in that phase. The clock pulses are nominally 5½ nanoseconds in duration. The time duration from the beginning of a clock signal in one clock phase to the beginning of a clock signal in the next subsequent clock phase is nominally 7½ nanoseconds.

3. Technology

While not illustrated, some of the features of the high performance technology utilized to construct the SP will be described. Emitter coupled subnanosecond circuits including gate arrays and Small Scale Integrated (SSI) circuits, known in the industry as the 100K family are used. The gate array circuits have 168 logic gates, 48 logic pins and power dissipation of up to 5 watts. The SSI packages, or chips as they are called, have 21 logic pins and power dissipation of up to a quarter of a watt. Most of the IP gate arrays plus 13 additional types that were designed specifically for this SP are used. The printed circuit cards have space for a maximum of 227 SSI circuit packages. Gate arrays require two SSI locations. The printed circuit cards are never fully populated with gate array circuit packages or chips, since a certain number of spare circuit locations for possible logic changes were provided. A pair of card pins for logic changes, check out and modifications are also reserved. In some instances power distribution pins on a card are the limiting factor for the necessary interconnections. The printed circuit cards are 11.3 inches wide by 10.8 inches deep, with logic, power, and ground connectors on three edges. Connectors on the rear edges of the cards plug into a back panel of the module through use of a conventional connector. The two side edges of the cards connect to the side panel to the module with Zero Insertion Force (ZIF) connectors. The cards are paired together and have two connectors for logic signals between the cards of the pair. These circuit packages are water cooled by a cold plate between the cards of the pair. Two cards of a cold plate are molded together into a subassembly part for insertion into the card module. Each module has room for a maximum of 52 cards or 26 card pairs. The SPM has 48 cards and the VPM has 52 cards. Ribbon cable and coaxial cable are used for logic interconnect between the SPM and VPM.

4. Major Sections

FIG. 8 is a block diagram of major sections of the Scalar Processor Module (SPM) of the SP. FIG. 9 is a block diagram of the major sections of the Vector Processor Module (VPM) of the SP. These two drawings taken together illustrate the machine organization at the major section level. First, as to the section block diagrams in general, there are a total of sixteen major logic sections with eight sections in each of the SPM and the VPM. Several additional auxiliary sections are present, such as the Scan Set and the external monitor however, these will be referred to only briefly since they are not necessary for a complete understanding of the invention. Each section has a character identifier. This identifier is also used as a prefix for exchange for all logic signals originating in that section. In the SPM (FIG. 8), break-out to the eight logic sections is on a functional basis. These sections provide architectually, required functions. In the VPM (FIG. 9) the sections are designated to accommodate explanation of the parallel pipelined operations of the vector processing sections.

The sixteen logic sections mentioned for FIG. 8 and FIG. 9 indicate their relative positions on the later detailed block diagrams. Referring now to the SPM block diagram of FIG. 8, there is illustrated the Instruction Flow Control (IF) section 400; the Local Store (LS) section 300; the Control Block (CB) section 500; the Mask Processor (MK) section 600; the Address Generation (AG) section 700; the Store Buffer (ST) section 800; the Scalar Processor Arithmetic Logic Unit (SPALU) 900; and the Loop Control (LC) section 1000. These sections will be described in detail below.

The VPM sections are shown in FIG. 9, and again the relative positions of the various sections are indicated as they will be related to more detailed block diagrams. These major sections include the Vector Control (VC) section 1100; the Vector Load (VL) section 1200; the Vector File (VF) section 1300; the Scalar Vector Data Transfer Control (SC) section 1400; the Vector Store (VS) section 1500; the Add Pipeline (AP) section 1600, which includes an Arithmetic Logic Unit (ALU); the Multiply Pipeline (MP) section 1700; and the Move Pipeline (MV) section 1800. A special control section Conflict Detection and Resolution 1900 is utilized to resolve conflicts between the various pipelined sections.

The following description will be an overview of the Local Store 168 logic section of the Scalar Processor Module. The purpose of the Local Store will be set forth and then the local memory itself will be described. We will review how the Local Store may be accessed and the various interfaces into and out of the Local Store will be discussed. Finally, another smaller memory called the input buffer associated with the Local Store will be explained.

Architectually, the Local Store 168 is defined as a large internal storage facility providing fast access to scalar operands. Referring to FIG. 10, it is shown that when an activity is switched onto the Scientific Vector Processor, data from the Local Store segment of the HPSU, which is defined by the first Activity Segment Table (AST) entry, is loaded into this Local Store memory located in the Scalar Processor Module. Physically as illustrated in FIG. 10, this is a 4,096 word memory and the Local Store segment, as defined by the first AST entry, can be larger or smaller than the 4,096 words. However, if it is smaller than the 4,096 words, then the whole segment is loaded into the Local Store memory of the machine. If its larger than 4,096 words only the first 4,096 words will be loaded into the Local Store memory. Any references to data beyond the first 4,096 words is made by referencing the HPSU. Referring to FIG. 10, assume that the overall dotted memory space represents the entire HPSU memory. From address 1,000,000 to address 1,017,777 in the HPSU is the Local Store segment as defined by the first Activity Segment Table entry. In the present case, it is drawn as being larger than 4,096 words. Now when an activity is switched to the Scientific Vector Processor, the first 4,096 words are loaded into the Local Store memory and any references beyond that have to go to the HPSU. Another thing that should be noted is that as the activity is being processed, and the data has been loaded into the Local Store memory, it is being changed and/or operated upon and no attempt is made at that time to update the memory data back in the HPSU. It is only when the activity is completed and deceleration of the activity occurs that the HPSU is updated. Everything that was in Local Store at the conclusion of the deceleration operation is returned to the same location of the HPSU.

A simplified block diagram of the Local Store (LS) is shown in FIG. 11. The heart of the Local Store section is the Local Store Memory 301 of 4,096 words. Another smaller memory called the input buffer 306 is adjacent to the Local Store. Interface to the HPSU is via the HPSU in data register 308. The Local Store is four words wide as seen by the LS in the data register 302.

It should be noted that the HPSU interface is of odd parity and differs from the rest of the machine, which is of even parity. The Local Store, Vector Load (LS, VL) output data register 311 goes to the Vector Processor. This is referenced as Vector Load (VL) because the section in the Vector Processor that it goes to is designated as the VL. Again it is four words wide and it is an 8 to 1 selector register.

On the far left is the LS SP out data register 304. This register 304 has a two word wide interface and it goes to the Scalar Processor (SP) section in the Scalar Arithmetic section. It takes a one word operand for a single precision scalar operation. If it is double precision, two words are used. This is a 16 to 1 selector register. Also from this register, two words go to the Store Buffer (ST) logic section via a driver 313.

In addition to these first two words to the ST interface, there are two words from the LS ST out data register 312. The interface to the ST section then is four words wide and this is a 4 to 1 selector register.

To initiate a deceleration operation everything is loaded into the Local Store 301 and from there the information goes through these two registers i.e. the LS SP out 304 and the LS ST out 312 registers. All four words are used at one time and then go to the ST section. From the ST section there is the output data register to the HPSU (not shown).

There is also a four word interface from the ST section into the Local Store. It enters the LS in data register 302 and that path is used as vector storage when these vectors enter the Local Store memory 301. On the far left is a two word interface from the CB section. To the right of the input buffer are two LS status registers 307, 309, a status register A 307 which is the staging register and a status register B 309 which is the actual holding register for status information. Status register B 309 is used when there is a reference to the HPSU and the HPSU detects an erroneous parity on the write data or on the address or the write controls. At this time, the HPSU will send back the status in the word zero position instead of the data and it will also send back another signal saying that an error has been detected on the interface. This will enable the capture of the status information that is sent back in this status register B 309. This error will cause the transfer to an interrupt sequence and it will be read out through the LS SP out data register 304 so that it may be identified. On the upper right hand corner of the FIG. 11 is shown how the Local Store bits are placed on the four cards of the machine.

One purpose of the Local Store 301 is for the storage of the operands and scalar information but it has other purposes also. Another purpose is for the temporary storage of data for acceleration. For example, when an activity is switched onto the Scientific processor, the first thing that is done is to obtain the mail box as previously described in the co-pending parent application U.S. Ser. No. 761,201. The referenced four words are taken from the mail box and are placed first in the Local Store for temporary storage.

Also brought in during acceleration are the Activity Segment Table data and the contents of all of the registers are loaded for entry first into the Local Store from where it is used as needed. When the Local Store is used for deceleration just the reverse of the acceleration operation takes place. Thus, first the data is put in Local Store and then returned to the HPSU. A third purpose of the Local Store is for storage of the operands for scalar instructions. When properly utilized this provides fast access to the Local Store for scalar instructions. It can also hold operands for Vector instructions.

Refer next to FIG. 12 which illustrates how the Local Store memory 301 is split up. It is divided into four blocks of word zero 301a, word one 301b, word two 301c and word three 301d, each block has 1,024 words with 36 bits of data and four bits of parity. The data inputs, of course, are separate, but the address is common to all four words so that when you read Local Store you will receive a block of four words. You can access the same or a different address from each block. The LS address bits 0-9 are shown at the bottom of the FIG. 12 along with the word select bits 10, 11. The first ten bits of the address are the left most ten bits of the address. They are used to address the memory and the last two single bits are the word select bits and are in the Local Store section itself. The word select bits control which word that is to be written. Everything else is controlled externally and arrive via external lines to select the words that are desired to be read. These are selected externally by control signals from other logic selections. Also the word select bits are combined with the valid bits, the masked bits and other bits to control the data flow into and out of the Local Store memory. This is also done externally to the Local Store.

The Local Store memory has a cycle time of thirty (30) nanoseconds. The memory is constantly being read, and it is a matter of whether the address is changed every cycle that makes it possible to read various selected locations. A block of four words may be read at one time. Also any combination of a four word group may be written at a time. That is, you can write all four words or you can write any word or any combination of words. You may write word zero; one; two; or three during scalar operations. For single precision you will always write one word at a time to be determined by the word select bits. However, for double precision for scalar operations words are written in pairs.

In the vector operations, however, the writing is determined by the valid bits along with the masked bits. There you may write any combination of the four at any one time.

Consider next how the Local Store is accessed. The first way is with Scalar instructions using the RS format as shown in FIG. 13. The function field f of the RS instruction format shown is 7 bits long. This determines the kind of instruction to be done. Basically, the t field, in so far as the Local Store is concerned indicates whether a single precision or a double precision operation is to be performed. The r1 field contains four bits and specifies the source operand for operand 1. It also indicates the location of the destination operand after the operands have been operated upon. The b and u fields together form an address for the operand 2. Now if b is zero, a special case, and u is less than 4,096, then the u field forms the address directly for the Local Store memory. If u is greater than 4,096 it still is going to go to the Local Store, but now it goes via the HPSU because that data is not presently in the Local Store memory. Rather that data is still in the HPSU and only the first 4,096 words have been loaded into the Local Store memory. If b is 15, the eleven bit pointer in S7 with the five right most bits of u, catenated on the right, form the Local Store address. Once again, this occurs only if its value is less than 4,096.

Thus, so long as the address is less than 4,096, the instructions may be cycled at a 30 nanosecond rate. Now there is one more way of using the RS format. This is when the Local Store is used as the source or destination for the operand. If b is between one and fourteen, then the virtual address (VA) is generated and masked into the Local Store segment and the Virtual Segment Offset (VSO) plus u is less than 4,096 then this forms a Local Store address. In this method of addressing, the cycle rate is substantially reduced and it may take as many as five cycles between references to the Local Store. This method passes through the Address Generation (AG) section which adds further to the rate slow down.

Finally, there is one other way to access Local Store and that is using the vector instructions. This is similar to the situation where b equals 1 to 14 on the scalar instruction in that there is not direct access to the Local Store on the vector side as it is with the scalar instructions. So for vector instructions, the map is in the Local Store segment if and only if the Virtual Segment Offset (VSO) plus or minus a stride is equal to or less than 4,096. If it is then, this will form the Local Store address. In this way, vector instructions can use the Local Store for the source or for the destination of vectors.

Refer next to FIG. 14. It is a pictorial diagram which will be used to describe the interface of word zero and word one with the Scalar Processor (SP) and with the Store Buffer (ST). What is shown is how the data is selectively passed through the register. There are several combinations in which the data can be transferred through this register. As shown in the table on the right of FIG. 14, the data can be passed straight through when the A input is connected to word 0 and the B input is connected to word 1. Alternately you can broadcast A. This means that the A input is sent to both word 0 and word 1. Conversely you can broadcast B and direct the B input to both word zero and to word one. Another selection that may be made is to cross them both over and send B to word zero position and A to the word one position.

FIG. 15 illustrates an example of a gate array. In this gate array there will be bit zero of the word zero and also bit zero of word one, but in the overall Scientific Processor you will see bit 0 of word one as bit 36 because of the interface to the SP section. This is because instead of being split up in two words, it is set up as a single 72 bit element, i.e. as bits 0-71. As shown, each gate array generates the same bit for word 0 and word 1 so that on each card there are ten of these gate arrays. There are 9 bits of data and one parity bit. The inputs shown are the actual 16 inputs. These sixteen inputs enter the LS SP out data register 304 and the 0 position will be the data arriving from the Local Store memory itself, i.e. word 0 bit 0. Coming into the 1 position will be data from the Local Store data memory word 1, bit 0. Into the number two position, from the Local Store data memory, is word 2, bit zero. The number three position receives word 3, bit zero. The fourth position will receive data from the HPSU input data register word zero, bit zero. Positions 5, 6, and 7 will respectively receive bit 0 from words one, two and three. Then in position 8 is the CB interface word zero bit zero, while nine receives it from the CB interface word one bit zero. Remember that the CB interface is just two words. In the tenth position is the SP augend data bit zero and then in the 11 th position is the Local Store status register bit zero and that comes from a corresponding status register which was shown earlier. In the 12th through 15th positions, information arrives from the input buffer memory and the input buffer is split up in the same way as the Local Store memory. That is it is divided into a four word wide memory. Remember that all of these signals can be crossed over as explained earlier. Continuing with the other side, in word one you will notice that all of the odd positions of the 16 way selector are left open while the even positions 0, 2, 4 etc. are connected. In the zero position is the Local Store data word 1, bit 0. Note that it enters here from two places. It also arrived on the other selector in position 1, whereas here, it enters position 0. The same thing occurs with the word 3, bit zero as it also does with HPSU word 1, bit zero.

Now the address for selecting the 16 way selection, also comes from the IFC logic section and note that in the middle there are dotted lines indicating that the same address lines control both sides. There are two separate selection lines entering it, so when you are selecting zero on the first side, you are selecting zero on the second side as well.

Next, refer to FIG. 16 which illustrates the other two words to the ST interface, i.e. words two and three. Now, remember that this interface is to the ST section and includes words two and three. Referring again to FIG. 11 this is the LS ST register with a 4 to 1 input register. Now this has the same possible combination of data transferred as words zero and one, but it only has a four way selector for selecting the data desired to pass through this register instead of 16 separate inputs. Once again the cross over control and the enable signal arrives from the Instruction Flow Control (IFC) logic section of the machine.

To briefly review the data input to these two words, the Local Store data memory word 2 comes into the zero position and the HPSU data word 2 comes into the one position. Word 0 of the SP data, this would be the SP augend, enters position 2, while the CB word zero enters the third position. On the B side, the LS data word three, the HPSU data word three, the SP data word one, and the CB data word one respectively enter positions 0, 1, 2, and 3.

Next, the interface to the Vector Processor shown in FIG. 17 will be described. Basically this is the Local Store, Vector Load interface. It is four words wide and goes to the Vector Processor. Notice that the selection control is from the AG. There exists a relationship between Vectors with the stride information and the starting address, and this relationship will be explained in detail when the AG section is described. We can, however, review the eight inputs that enter this register, together with the eight way selector. First, we have Local Store data word zero 311a which enters the zero position. Next, the Local Store data word one 311b comes into position one, and Local Store word two 311c arrives at position two with Local Store data word three 311d entering position three. HPSU data word zero through data word three enter positions 4 through 7. This relationship is the same for all of the inputs since all four words are identical as far as the data that enters into the zero position is concerned. The reason for having each word of Local Store in the HPSU entering each position is because of the starting address. The starting address can start on any particular data zero, one, two or three. If it starts on word 3, then word 3 has to go to the word zero position and then the selection is controlled from the Address Generation (AG) section.

The input data register to the Local Store interface is illustrated in FIG. 18. First, consider the overall write data register. The data path is four words wide and a four way selector register is used for selection. In the zero position of the first selector is the ST in data word zero, while entering the zero positions of remaining three selectors are ST in data words 1, 2, and 3.

Similarly, the HPSU in data words 0 through 4 enter position 1 of each of the selectors, while the SP in data words 0 and 1 enter positions 2 of each of the selectors. Positions 3 of each of the selectors remains open and are not used. Once again the cross over control is the same here as on the earlier selectors and once again the cross over control in the address is used to select the input data and is controlled from the SP section.

Refer next to FIG. 19 which illustrates the Local Store Write Pulse Generation. From the four AND gates 321, 322, 323, 324 across the top of the figure are provided the write pulses for words 0, 1, 2, and 3. These four AND gates receive a wide phase $\phi 1$ signal as a common input. A wide phase one is used because a minimum pulse width of 6 nanoseconds is required as a wide phase, while the minimum pulse width of a normal phase one is only 5 nanoseconds.

Shown in FIG. 19 is the Local Store write control register 302 which generates the enable signals to write into the Local Store. These are controlled separately so that you can selectively write into just word zero or word one or word two or word three or any combination thereof. A table is shown on the lower right hand side of FIG. 19 which indicates what each of the various combinations of select control bits from the IFC provide. For example, a 00 indicates the selection of either a Vector operation or else an idle condition. The combination of 01 is a single precision IFC address, while 10 indicates a single precision AG address. Finally, a 11 indicates a double precision selection. When you are in an idle condition, no input signal is active and no write operation to the Local Store can occur. When the input word selection bits are 10 and 11 and they enter the decoder, then the selected line becomes active and the selected word is written into the Local Store.

Entering the position 3, note that it is going to write a pair of words at a time so that double precision may be performed. It is either going to write word zero and one, or its going to write words two and three and if you are selecting the 3 position, you are going to write one of those two pairs. Once again there is a select line on this and that comes from the IFC also. Note that the selected address bit 10 from IFC or AG determines whether you are going to write word zero or one. Thus, you will look at bit 10 from the IFC section or from the AG section and then if bit 10 is there you will write words two and three, if bit 10 is not there, you will write words zero and one.

The Input Buffer 306 generally shown in FIG. 11 is illustrated in more detail in FIG. 20. As shown in FIG. 20, it is divided up the same way as the Local Store memory i.e. as word zero 306a, word one 306b, word two 306c, and word three 306d. But notice here that there are only 16 words in each block, for a total of 64 words in the entire Input Buffer 306. The bits of data and parity correspond to the Local Store. Now the data input to the Input Buffer comes directly from the HPSU in data register 308 and note there is a separate write and read address for the Input Buffer 306. The write address counter and the read address counter is the same for all four words. The input data from the HPSU in data register 308 are word zero, word one, word two and word three. The Input Buffer is made up four chips of 16 locations by 40 bits each and it also has a 30 nanosecond cycle time. You may change the address and get new data every 30 nanoseconds or you may write into it every 30 nanoseconds. You may also read and write in the same cycle and this is because of the way that the memory chip is made. If you start a write operation it will read the data from the address that you were previously reading and write the new data during the same memory cycle. It should be repeated that it has separate read and write address counters.

Further, you may read or write a block of four words simultaneously, since the read operation is substantially the same as the Local Store memory. Also, the address counters simply increment by one and merely loop around the address zero to basically operate in a first-in first-out manner. Finally, the purpose of the Input Buffer is for temporary storing of scalar operands when they are retrieved from the HPSU. All scalar operands are written into the Input Buffer when they are retrieved from the HPSU. When they return from the HPSU, they are written into the HPSU buffer and recall that when scalar operands are received from the HPSU via the HPSU in data register 308 they will be written into the Input Buffer unconditionally.

Returning to FIG. 11, notice that there is another path in the HPSU in data register 308 for these operands to be used immediately at the SP out data register. This allows data that is written into the Input Buffer to be used or ignored. The only time that the data will be used in the Input Buffer is if there is a conflict. When a conflict exists, the data can not enter straight from the HPSU in data register 308, so you must read it out of the Input Buffer 306.

In view of the foregoing description and discussion of the invention and a preferred embodiment, it can be seen that the various stated objectives and purposes of the invention have been achieve. It is of course understood that various changes in logical circuit arrangement, circuit selection, and functionality will become apparent to those skilled in the art after have considered the teaching, without departing from the spirit and scope of the invention. Accordingly, what is intended to be protected by Letters Patent is set forth in the claims.

We claim:

1. A local control storage structure for use in a scientific data processing system which system includes a high performance main storage unit and a scientific processor and which processor includes a scalar processor module and a vector processor module, said local control storage structure comprising:

a single cycle access local store means for storing control data words, each of said control data words being addressable by address signals;

said local store means having single cycle access time and physically configured in the same manner as said high performance main storage unit such that data words stored in said high performance main storage unit may be directly transferred to, directly addressed in the local store means and directly transferred back to the high performance main storage units in the same way as they are transferred to and from, and directly addressed in, said high performance main storage unit;

first interface means coupled between said high performance main storage unit and said local store means for transferring control data words therebetween, at a transfer rate equal to that of said high performance main storage unit;

second interface means coupled between said scalar processor module and said local store means for transferring data words therebetween at a transfer rate equal to that of said local store means so that data words in said local store means may be accessed by said scalar processor module in a single memory cycle of said local store means;

a third interface means, including a vector load section, coupled between said local store means and said vector processor module so that data words in said local store means may be accessed by said vector processor module in a single memory cycle of said local store means; and an input buffer means coupled between said high performance main storage unit and said first interface means to provide a means for selectively reading from and writing into said scalar processor module data from said high performance main storage unit.

2. The local storage structure as set forth in claim 1 wherein there is also included status register means coupled between said high performance main storage unit and said scalar processor module to provide staging and status holding capabilities to said local storage structure.

3. A local storage structure for use in a scientific data processing system which system includes a high performance main storage unit and a scientific processor having a scalar processor module and a vector processor module, said local storage structure comprising:

a single memory cycle access local store means organized as and of a similar configuration to the high performance main storage unit;

first interface means coupled between said general purpose, single memory cycle access, local store means and said high performance main storage unit to provide data transfer therebetween;

and second and third interface means including further means for coupling said single memory cycle access local store means to the scalar and vector processor modules of the scientific processor to provide said scalar and vector processor modules with memory access at a rate equal that provided by their scalar and vector registers.

4. The local storage structure as set forth in claim 3 wherein there is also included a third interface means coupled between said local store means and said vector processor module whereby data words in said local store means may be accessed by said vector processor module in a single memory cycle of said local store means.

5. The local storage structure as set forth in claim 4 wherein there is further included in said vector processor module a vector load section and said third interface means is coupled between said local store mens and said vector load section of the scalar processor module to enable vector data to be transferred from said local store means to said vector load section in a single memory access time of the local store means.

6. The local storage structure as set forth in claim 3 wherein there is further included in the local storage structure, an input buffer means coupled between said high performance main storage unit and said first interface means to provide a means for selectively reading from and writing into said scalar processor module data from said high performance main storage unit.

7. The local storage structure as set forth in claim 3 wherein there is also included status register means coupled between said high performance main storage unit and said scalar processor module to provide staging and status holding capabilities to said local storage structure.

8. A local storage structure for use in a scientific data processing system which system includes a high performance main storage unit and a scientific processor having a scalar processor module and a vector processor module, said local storage structure comprising:

a single memory cycle access, local store means organized as is the high performance main storage unit and of a similar configuration;

first interface means coupled between said general purpose, single memory cycle access, local store means and said high performance main storage unit to provide data transfer therebetween;

said first interface means including further means for coupling said, single memory cycle access local store means to the scalar and vector processor modules of the scientific processor to provide said scalar and vector processor modules with memory access as fast as that provided by their scalar and vector registers; and second interface means coupled between said single memory cycle access local store means and the first interface means to provide a recycle loop feature to said local storage structure.

9. The local storage structure as set forth in claim 8 wherein there is also included a third interface means coupled between said local store means and said vector processor module whereby data words in said local store means may be accessed by said vector processor module in a single memory cycle of said local store means.

10. The local storage structure as set forth in claim 8 wherein there is further included in the local storage structure, an input buffer means coupled between said high performance main storage unit and said first interface means to provide a means for selectively reading from and writing into said scalar processor module data from said high performance main storage unit.

11. The local storage structure as set forth in claim 8 wherein there is also included status register means coupled between said high performance main storage unit and said scalar processor module to provide staging and status holding capabilities to said local storage structure.

12. A local storage structure for use in a scientific data processing system which system includes a high performance main storage unit and a scientific processor and which processor includes a scalar processor module and a vector processor module, said local storage structure comprising:

a general purpose store means for storing data words, each of said data words being addressable by address signals;

said local store means configured in the same manner as said high performance main storage unit such that data words stored in said high performance main storage unit may be directly transferred to, directly addressed in the local store means and directly transferred back to the high performance main storage units in the same way as they are transferred to, from and directly addressed in said high performance main storage unit;

first interface means coupled between said high performance main storage unit and said store means for transferring data words therebetween, at the transfer rate of said high performance main storage unit; and second interface means coupled between scalar processor module and said local store means for transferring data words therebetween at the transfer rate of said local store means whereby data words in said local store means may be accessed by said scalar processor module in a single memory cycle of said local store means a third interface means coupled between said local store means and said vector processor module whereby data words in said local store means may be accessed by said vector processor module in a single memory cycle of said local store means.

13. The local storage structure as set forth in claim 12 wherein there is further included in the local storage structure, an input buffer means coupled between said high performance main storage unit and said first interface means to provide a means for selectively reading from and writing into said scalar processor module data from said high performance main storage unit.

14. The local storage structure as set forth in claim 12 wherein there is also included status register means coupled between said high performance main storage unit and said scalar processor module to provide staging and status holding capabilities to said local storage structure.

* * * * *